Patented Feb. 14, 1939

2,146,781

UNITED STATES PATENT OFFICE 2,146,781

METHOD OF PRODUCING TRANSPARENT BLOCKS OF CAMPHOR

Frederick W. Wanderer, Penns Grove, N. J., assignor to E. I. du Pont de Nemours & Company, Wilmington, Del., a corporation of Delaware No Drawing. Application December 8, 1936, Serial No. 114,861

4 Claims. (Cl. 18—48)

This invention relates to transparent to translucent tablets, blocks or other shaped pieces of camphor, more particularly it relates to transparent blocks or tablets of camphor which remain stable upon standing, still more particularly it relates to a process of preparing transparent to translucent blocks or tablets which remain stable upon standing, and still more particularly it relates to a process of reshaping rods, bars, strips, sheets, etc., of plastic camphor.

This invention has for an object the preparation of new stable shaped forms of camphor. A further object is the preparation of camphor in a stable transparent form. A still further object is the production of small tablets or blocks of camphor in commercial quantities, and in general an advancement in the art. Other objects will appear hereinafter.

These objects are accomplished by the following invention which comprises compressing a shaped plastic piece of camphor. I have discovered that if shaped pieces of camphor are compressed while they are still in a plastic state, transparent to translucent pieces are formed which are stable upon standing. Ordinary pressed or sublimed camphor blocks lose their plasticity upon standing after a few days' time. Camphor which has been extruded through a restricted opening while it is in a plastic state (viz., by cooling liquid camphor to a temperature of 50°–170° C. or by heating solid or crystalline camphor until it becomes plastic, as described in a co-pending application of Ivan Gubelmann and William S. Calcott, Serial No. 114,862, filed December 8, 1936, remains stable, that is, it remains in a plastic condition from two to ten days.

The invention will be further illustrated but is not intended to be limited by the following examples.

Example I

Liquid camphor having a melting range of 175°–177° C. is fed continually into a machine in which it is gradually cooled and at the same time pushed forward, forcing this camphor which is in the plastic state through a restricted opening measuring ½″ in diameter. As the plastic camphor reaches the restricted opening, its temperature ranges from 70°–170° C. The extruded material is cut into short lengths and then compressed in a die at a temperature of about 80° C. and under a pressure of 100 to 500 pounds per square inch for ten seconds. Plastic camphor in the form of a rectangular strip may be similarly processed.

Example II

Liquid camphor having a melting range of 160°–164° C. is placed in a 2″ x 15″ cylinder and allowed to cool to about 140° C., after which it is forced through an opening ⅜ inch in diameter. The camphor in rod form is then cut into small sections which are compressed in a die at a pressure between 50 and 7000 pounds per square inch, while they are still in a plastic state.

Example III

Solid camphor melting between 160°–165° C. is placed in a 2″ x 15″ cylinder. The cylinder is heated to 150° C. for a period of four hours. The camphor is then forced through an opening ⅜″ x 1″. The rectangular strip is cut into one-inch blocks and they are stamped in a die while still plastic and transparent at a temperature from 10° C. to just below the melting point.

It is essential to obtain camphor in a transparent or translucent stable form that the material to be reshaped be in a plastic state. Transparent camphor can be made in transparent blocks by subjecting crystalline camphor to high pressures. They become opaque and crystalline upon standing after a short period. The material to be reshaped may be round, square, rectangular, etc. Camphor which has been recently sublimed can be shaped into transparent forms provided the material is in a plastic state and at a proper temperature. Sublimed camphor becomes brittle and crystalline upon standing a short time.

The temperature suitable for reshaping may vary widely; for example, temperatures from 10° C. to just below the melting point of the camphor block, rod or the like give fair results, improved results are obtained from 50° C. to 170° C., and still further improved results are obtained between 80° C. and 150° C.

The pressure may also vary widely. Good results have been obtained at temperatures between 50 and 7000 pounds per square inch, still better results are obtained at pressures between 100 and 500 pounds per square inch.

The length of time the blocks are subjected to pressure is dependent upon the pressures and temperatures used and the plasticity of the material to be reshaped. Thus, a period from about one second to five minutes results in fair products. A period of about two seconds at a temperature from 80° C. to 150° C. and at a pressure from 100 to 500 pounds per square inch is preferred.

This invention has the advantage that camphor may be easily and economically prepared in a commercially desirable form. It has the additional advantage that it produces a more merchantable article.

It will be apparent to those skilled in the art that many different embodiments of the invention may be made without departing from the spirit and scope thereof. It is to be understood that I do not limit myself to the specific embodiments thereof except as defined in the appended claims.

I claim:

1. In a process of producing transparent camphor which comprises cooling hot liquid camphor until it reaches a plastic state and continuously extruding the camphor while it is in a plastic state through a restricted opening to form a strip and cutting the strip into short lengths while in a plastic state; the step which comprises reshaping said short lengths by compressing them while they are still in a plastic state.

2. In a process of producing transparent camphor which comprises cooling hot liquid camphor until it reaches a plastic state and continuously extruding the camphor while it is in a plastic state through a restricted opening to form a strip and cutting the strip into short lengths while in a plastic state; the step which comprises reshaping said short lengths by compressing them while they are still in a plastic state at a temperature of from 80° C. to 150° C.

3. In a process of producing transparent camphor which comprises cooling hot liquid camphor until it reaches a plastic state and continuously extruding the camphor while it is in a plastic state through a restricted opening to form a strip and cutting the strip into blocks while still in a plastic state; the step which comprises reshaping said blocks by compressing them while they are in a plastic and transparent state at a temperature of 80° to 150° C., and a pressure of 100 to 500 pounds per square inch.

4. The process of claim 3 wherein the pressure is applied for a period of about two seconds.

FREDERICK W. WANDERER.